Dec. 5, 1933. J. HALTENBERGER 1,937,653
AUTOMOBILE DRIVE AXLE
Filed May 28, 1931 5 Sheets-Sheet 1

Inventor
Jules Haltenberger,
By Hood + Hahn
Attorneys

Dec. 5, 1933.    J. HALTENBERGER    1,937,653
AUTOMOBILE DRIVE AXLE
Filed May 28, 1931    5 Sheets-Sheet 2

Inventor
Jules Haltenberger,
By Hood + Hahn.
Attorneys

Dec. 5, 1933.          J. HALTENBERGER          1,937,653
AUTOMOBILE DRIVE AXLE
Filed May 28, 1931          5 Sheets-Sheet 4

Inventor
Jules Haltenberger,
By Hood + Hahn.
Attorneys

Patented Dec. 5, 1933

1,937,653

UNITED STATES PATENT OFFICE 1,937,653

AUTOMOBILE DRIVE AXLE

Jules Haltenberger, Indianapolis, Ind.

Application May 28, 1931. Serial No. 540,537

62 Claims. (Cl. 180—73)

The present application relates to the axles of automotive vehicles, and more particularly to axles so constructed that the wheels of the vehicle may be independently sprung on the frame. It will be seen, thus, that the present invention is concerned with the mounting of all four wheels of the vehicle, though in the accompanying drawings, I have illustrated only drive wheels and drive axles, since the most difficult problems concerned with independent springing are those which arise with respect to the independent springing of the drive wheels.

One of the objects of this invention is to provide a drive axle construction such as to permit independent movement, in a generally vertical plane, of one driving wheel, relative to the other driving wheel. This arrangement is known in the art as independent wheel springing. Independent wheel springing is not broadly new at the present time, but in all the prior constructions of which I am aware, the arrangements of the parts have been such as to necessitate the use of three or more major units and two or more universal joints; or, in place of universal joints, two sets of power transferring means, to make up a complete axle mechanism.

A further object of this invention is to provide, in a swinging axle organization, a construction whereby the degree of variation of the vehicle tread resulting from swinging of the axles is reduced substantially to a negligible quantity, and whereby that variation is equally divided between the two ends of the jointed axle unit.

A further object of the present invention is to provide an axle comprising two units, the inner end of one of said units being fulcrumed to the vehicle frame, and the inner end of the other of said units being fulcrumed on the inner end of said first-mentioned unit, whereby independent wheel springing may be obtained. A further object of this invention is to provide units of the character described including power transmitting shafts, said shafts being connected, at or near the point at which the said units are fulcrumed together, with a single universal joint. A further object of this invention is to provide a driving axle of the character described adaptable for use with the well known Hotchkiss drive, and also applicable to torque tube drive. A further object of this invention is to provide an independent springing driving axle construction in which the two wheel driving shafts will rotate at the same angular velocity, irrespective of relative vertical movement of the free ends of the shafts, and irrespective of the condition of load of the vehicle.

A further object of this invention is to provide a unit which may be substituted for a unit of the drive mechanism of a vehicle of ordinary construction, such substituted unit being of such construction as to provide for independent springing of the drive wheels of such vehicle.

A further object of the invention is to provide a two-unit axle with independent wheel springing, which can be used for front wheel drive, rear wheel drive, or multiple drive. While the accompanying drawings illustrate only rear wheel drive constructions, it will be obvious that entirely analogous mechanism may be utilized in applying the principles of the illustrated mechanism to front wheel or multiple drives.

Independent wheel springing has many advantages over the springing system generally in use in this country. One of these advantages lies in the fact that, by the reduction of unsprung weight, the contact between driving wheels and the road is improved. Better riding quality is introduced into the vehicle, because only half of the axle responds to an obstruction opposing one wheel, so that the degree of tilting of the vehicle caused by such obstruction is materially less than in vehicles wherein the axle is rigid from wheel to wheel. It has also been found that vehicles equipped with independently sprung wheels can take turns at relatively high speeds. This is particularly true when the vehicles are equipped with axle constructions in which the axle housings are fulcrumed in the center, known in the art as swinging axles.

The Hotchkiss drive is well known in the art, in fact over 80% of the various models of automobiles manufactured in the United States employ it. It is characterized by taking the torque reaction and propulsion by the axle springs. The Hotchkiss drive has many advantages, the principal among them being that the torque and torque variations are taken by a resilient member (the spring), hence this resilient member distorts the necessary amount to balance the torque, resulting in an automative drive of desirable elasticity.

It is deemed unnecessary here to discuss known types of independent wheel springing axles further than to state that all of such devices known to me require the provision of at least two universal joints in the train between the two driving wheels.

All such devices are constructed so that the housing containing the rear axle gearing (and differential) is rigidly connected to the automobile frame or to the engine, thus precluding the employment of the Hotchkiss drive without undue complications.

Figure 1:
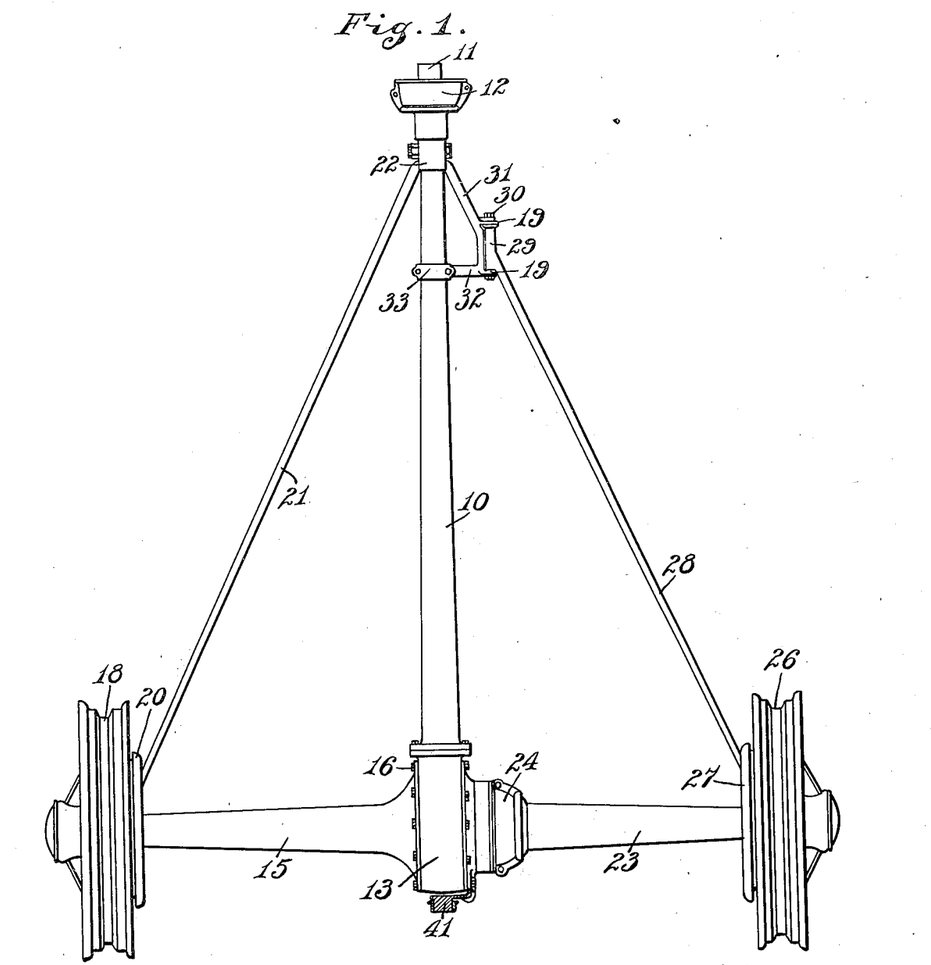
Fig. 1 is a plan view of driving mechanism constructed in accordance with my invention, a torque tube type of drive being illustrated.
Figure 2:
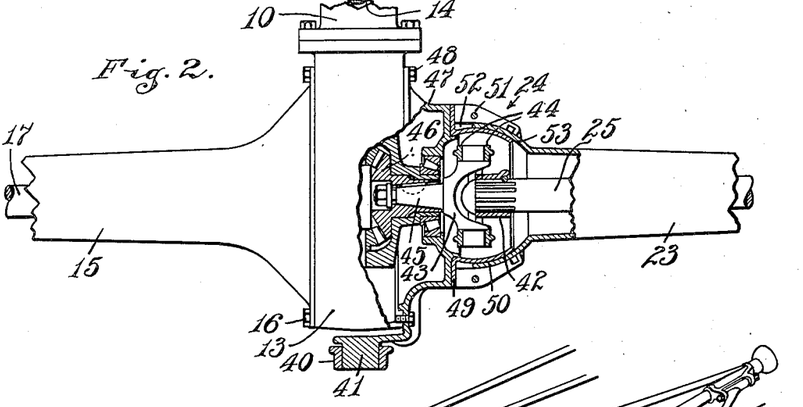
Fig. 2 is a fragmental plan, on a larger scale, of a part of the mechanism illustrated in Fig. 1, parts of the housings being broken away, and parts of the driving mechanism being illustrated in section.
Figure 3:
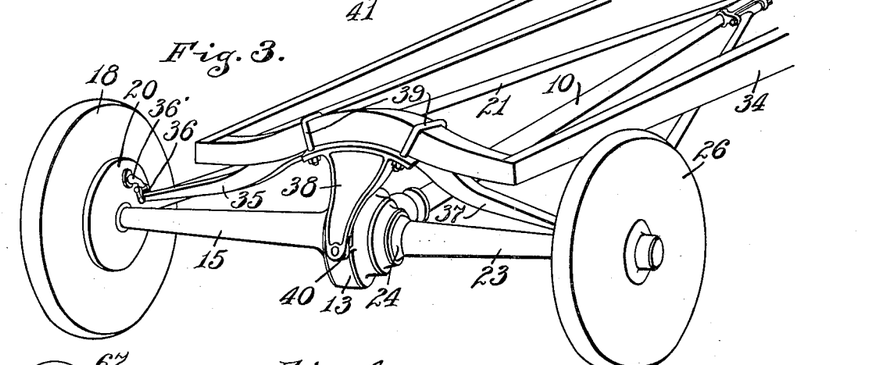
Fig. 3 is a perspective view of the construction illustrated in Fig. 1 and illustrating the manner of mounting the vehicle frame.

Referring more particularly to Figs. 1 to 3 inclusive, it will be seen that I have illustrated a torque tube or propeller shaft housing 10 enclosing a propeller shaft 14. Said housing 10 is rigidly connected at its one end to a differential housing 13, and at its opposite end is connected, through the spherical joint 12 of any desired construction, to a transmission housing (not shown). Within the joint 12 there is housed a universal joint connecting the shaft 14 with a hub 11, said hub being connected to the driven shaft of the transmission. The opposite end of the propeller shaft 14 is, of course, operatively connected to one of the elements of the differential mechanism enclosed within the housing 13.

A tubular housing 15 is rigidly secured to one side of the differential housing 13 by machine screws 16, or the like, and said housing 15 extends laterally from the differential housing 13 substantially perpendicular to the housing 10. Said housing 15 encloses shaft 17, the inner end of which is rigidly connected to an element of the differential mechanism, and the outer end of which is operatively connected to a drive wheel 18.

Integrally or otherwise rigidly secured to said housing 15 adjacent the outer end thereof is a flange 20 cooperating in the usual manner with the usual brake drum. Rigidly or integrally secured to said flange 20 is a radius rod 21 projecting forwardly and suitably secured to a bracket 22 carried by the propeller shaft housing at a point remote from the differential housing 13.

A third tubular housing 23 is connected, through a suitable flexible connection illustrated generally at 24, to the other side of the differential housing 13, said housing 23 being adapted to assume a position in alignment with the housing 15. A shaft 25 enclosed within said housing 23 is operatively connected, at its outer end, to a drive wheel 26. Integrally or otherwise rigidly secured to the outer end of the housing 23 is a flange 27 similar to the flange 20; and a radius rod 28, rigid therewith, extends forwardly therefrom and terminates in a sleeve 29. Said sleeve 29 is adapted to receive a bolt 30 extending through said sleeve, and through lugs 19 on a bracket 31, said bracket being secured at its forward end to the element 22, and having an arm 32 which arm is secured to housing 10 by the cap 33. It will be seen that the flexible joint 24, together with the hinge made up of the sleeve 29 and the bracket 31, will permit independent oscillation, in a plane perpendicular to the plane of the drawings, of the wheels 18 and 26.

Referring, now, to Fig. 3, it will be seen that I have illustrated a vehicle frame 34 to which is secured a spring of the type primarily used in Ford automobiles. This type of spring may be considered, for some purposes, as two independent springs 35 and 37. The spring 35 is secured, at its outer end, to a shackle 36, of usual construction, said shackle being carried upon a bracket 36' secured to the flange 20. The outer end of the spring 37 is similarly secured to the flange 27 adjacent the wheel 26. A bracket 38 suitably secured to the frame as by spring-clips 39, is provided at its lower end with a collar 40 embracing, and suitably secured to, a fulcrum stud 41 carried by the differential housing. It will be obvious that the connection of the bracket 38 to the differential housing 13 is such as to permit oscillation of the housing 15 in a vertical plane with respect to the frame 34.

At its inner end, the shaft 25 carries one element 42 of a universal joint of well known construction, the cooperating element 43 of said joint being connected to said element 42 by the usual clamp rings 44. Said element 43 is formed with a reduced extension 45 to which is keyed an element 46 of the differential mechanism within the housing 13.

A housing member 47 is secured to the housing 13 by means of machine screws 48, or the like, said housing member being formed at its inner end, to correspond in shape with the inner end of the usual axle housing incorporated in a vehicle of known type, so that said element 47 may be secured to a differential housing 13 from which a rigidly secured axle housing has previously been removed. The housing member 47 preferably carries the fulcrum stud 41.

Said housing member 47 has secured thereto, at its outer end, a member 49 which is provided with a part-spherical portion 50 projecting laterally with respect to the housing 13. A part-spherical casing comprising a pair of mating elements 51 is sleeved over said portion 50, the internal dimensions of said casing being such as to provide a recess 52 between the inner wall of the casing and said portion 50. Within said recess 52 there is mounted a part-spherical flange 53 integral with, or rigidly secured to, the inner end of the housing 23.

It will be obvious, from the above, that the disclosed arrangement provides a drive mechanism in which the differential housing 13, the axle housing 15, and its enclosed shaft 17 are oscillably mounted on the frame 34, and in which the housing 23 and its axle are oscillably mounted on the differential housing 13. It will also be obvious that the mechanism above described comprises a structure which, by substitution of the elements 23, 25, and 42 to 53 inclusive, for one axle housing and shaft of a standard construction, may be utilized to convert a vehicle of standard construction into a vehicle in which the drive wheels are practically independently sprung on the frame.

Considered in another light, it will be seen that the differential housing 13, axle housing 15, shaft 17, propeller shaft housing 10 and side-plate 47 compose one axle-housing unit, which might be termed the primary unit because it is directly fulcrumed to, and oscillable relative to the automobile frame. Housing 23 with its shaft 25 might be termed the secondary housing unit because it is fulcrumed to the aforementioned primary unit. Figs. 4 to 12 inclusive also clearly indicate the existence of a primary housing unit and a secondary housing unit, as will appear as the description proceeds. In Figs. 1 to 12 inclusive it is clearly indicated that the primary unit contains and carries the rear axle gearing and the differential.

Figure 4:
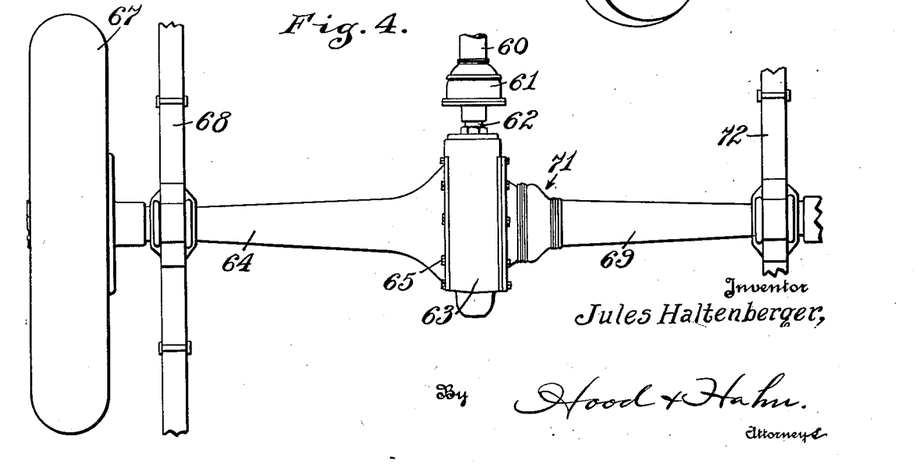
Fig. 4 is a plan view of drive mechanism constructed in accordance with my invention, a Hotchkiss type of drive being illustrated in connection with semi-elliptical springs.
Figure 5:
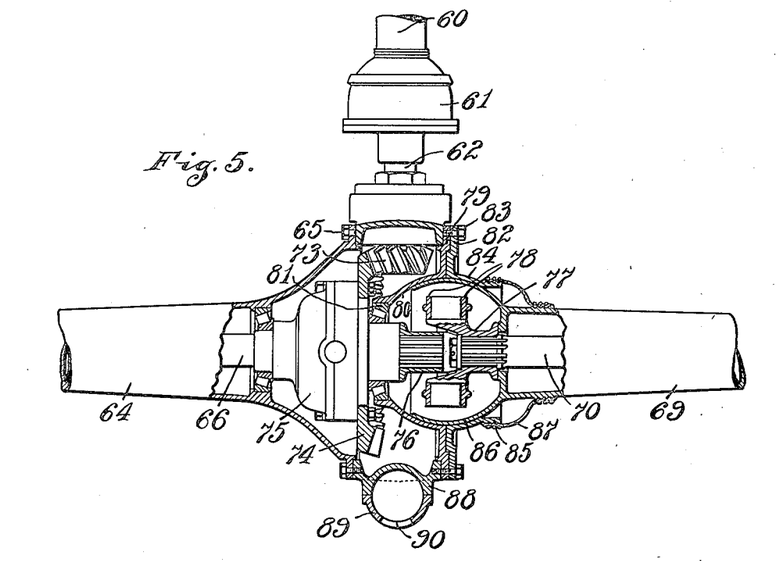
Fig. 5 is a fragmental plan on a larger scale, of a portion of the mechanism illustrated in Fig. 4, parts of the housings being broken away, and part of the drive mechanism being shown in section.

Referring, now, to Figs. 4 and 5, it will be seen that I have illustrated a propeller shaft 60 connected through a universal joint enclosed in the housing 61, to a shaft 62. The shaft 62 is mounted in the usual bearings which transmit the torque reactions to the differential housing 63, and at its inner end, said shaft 62 carries a pinion 73. A tubular housing 64 is rigidly secured to said differential housing 63 by machine screws 65, or the like, and said housing 64 encloses a shaft 66 with the outer end of which is operatively associated a drive wheel 67 carried by said housing 64. Adjacent its outer end, the housing 64 carries a semi-elliptic spring 68 securely mounted in the usual manner.

Another tubular housing 69 enclosing a shaft 70, is connected to the differential housing 63 through a joint illustrated generally at 71, and said housing 69 carries a second semi-elliptic spring 72.

The pinion 73 meshes with a gear 74 of differential mechanism 75. One element of said differential mechanism carries one member 76 of a universal joint of well known construction, the other member 77 of said joint being connected to said member 76 by the usual clamp rings 78.

An element 79, which may preferably be so constructed as to be capable of substitution in place of the usual rigid axle housing, is secured in place on one side of the housing 63, and said element 79 is formed with a part-spherical portion 80 projecting inwardly into said housing 63, said portion 80 being formed to receive a roller bearing 81 in which the mechanism 75 is journaled. A plate 82, secured to said housing 63 by machine screws 83, or the like, likewise securing the element 79 in place, is formed with a part-spherical portion 84 mating with the portion 80, and projecting outwardly to terminate in a substantially cylindrical flange 85. A part-spherical flange 86 formed on, or secured to, the inner end of the housing 69 is cooperably received within the portions 80 and 84, whereby said housing 69 is oscillably secured to the housing 63. A flexible boot 87 is secured to the flange 85 and to the adjacent end of the housing 69.

Figure 7:
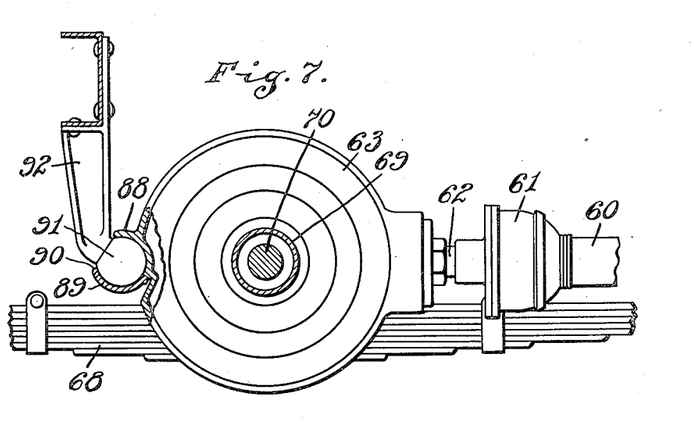
Fig. 7 is a longitudinal section illustrating the manner of mounting the differential housings shown in Figs. 4, 5, and 6.

The housing 63 is provided with a part-spherical element 88 with which cooperates an element 89 to form a spherical socket having an opening 90 therein, said socket receiving a ball 91 formed on a bracket 92 secured to the vehicle frame, whereby the housing 63 is oscillably secured to the frame (see Fig. 7). This connection, of course, permits a limited universal movement of the housing 63, so that normal tendencies of the housing 63 to oscillate about the axis of the shaft 66 are transmitted to the spring 68.

Figure 6:
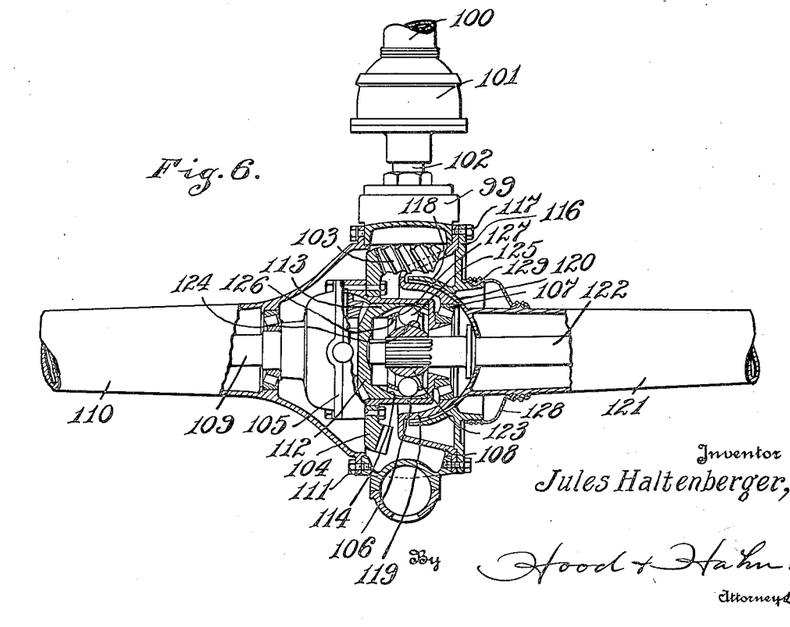
Fig. 6 is a view similar to Fig. 5 and illustrating a construction incorporating a constant angular velocity universal joint.

In Fig. 6 is illustrated a different form of connection. A tubular propeller shaft 100 is connected through a universal joint in the housing 101 to a shaft 102, said shaft being mounted in suitable bearings in the differential housing 99, and carrying within said housing a pinion 103. Said pinion 103 meshes with gear 104 of differential mechanism illustrated generally at 105, and said gear 104 is secured to an element 106. The projecting end of said element 106 is journaled in a roller bearing 107 suitably supported by a member 108 secured to the housing 99 and projecting thereinto.

A shaft 109 having its inner end secured to an element of the differential mechanism 105 is received in a tubular housing 110 rigidly secured to the housing 99 by machine screws 111, or the like.

Another element 112 of the differential mechanism is formed with a projecting portion 113 in the inner surface of which are formed a plurality of axially extending radiused grooves 114.

A plate 116 secured to the housing 99 by machine screws 117, or the like, which likewise hold in place the member 108, is formed with an inwardly projecting part-spherical flange 118, said flange cooperating with a part-spherical portion 119 of the element 108, to form a recess within which is oscillably received a part-spherical flange 120 carried by a tubular axle housing 121. A shaft 122 is received in said housing 121 and, at its inner end, carries a member 123 in which are formed a plurality of axially extending radiused grooves 124. The grooves 124 correspond in number and position to the grooves 114, and a plurality of balls 125 are received in said grooves 114 and 124, each ball entering one groove 114 and one groove 124.

A retaining collar 126 formed with a plurality of peripherally extending slots 127 is received between the elements 113 and 123, each of the slots 127 receiving one of the balls 125. The universal joint just described is substantially the "Rzeppa" constant angular-velocity universal joint now on the market. The location of the universal joint in the center line of the axle fulcrum results in what may be termed absolutely independent springing of the wheels (not shown) associated with the shafts 109 and 122.

A boot 128 is secured to a flange 129 on the plate 116, and to the adjacent end of the housing 121.

Figures 8, 9:
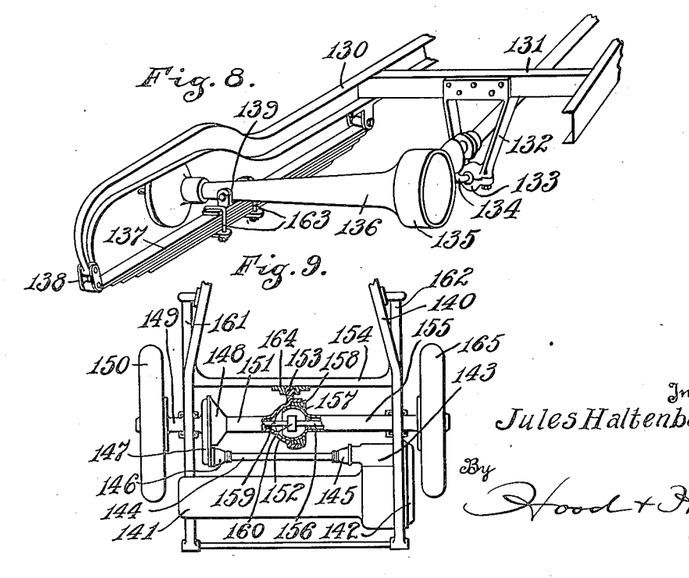
Fig. 8 is an isometric view of mechanism similar to that illustrated in Fig. 4, and illustrating a different manner of securing the differential housing to the frame.
Fig. 9 is a plan view, partly in section, of drive mechanism adapted for use with a transversely mounted power unit.

An alternative to the means illustrated in Fig. 7 for oscillably securing the housing 63 to the vehicle frame is illustrated in Fig. 8. In Fig. 8, I have shown a vehicle frame 130 having a transverse member 131 to which is secured a depending bracket 132. Said bracket is formed in its lower end with a part-spherical socket, and a cap 133 cooperates with said socket portion to receive and retain a ball carried by an arm 134 secured to a differential housing 135. A tubular axle housing 136 projects laterally from said differential housing 135, being rigidly secured thereto, and the outer end of said housing 136 is oscillably secured to a semi-elliptic spring 137, one end of said spring 137 being secured to a frame member 130 by the usual shackle 138.

As has before been stated, ordinarily the outer ends of the axle housings will be rigidly secured to the vehicle springs. In the embodiment illustrated in Fig. 8, however, a bracket 139 is oscillably mounted on the housing 136 at a point remote from the differential housing 135, and said bracket is clamped to the spring 137 by means of a pair of spring-clips 163.

In Fig. 9 I have illustrated a drive axle with independent wheel springing in connection with a vehicle in which the engine 141 is mounted transversely of the vehicle frame 140. In the claims appended hereto, I have defined this arrangement by stating that the main shaft of the prime mover is disposed transversely of the vehicle frame.

As illustrated, one end of the engine 141 is mounted on the upper surface of a member of the frame 140, while the opposite end of said engine is secured below the opposite frame member. A gear train indicated at 142, connects with transmission 143, and a propeller shaft 144 is connected at its one end to the transmission 143 through a joint 145, the opposite end of said propeller shaft being connected through a joint 146 to an element of a second gear train in housing 147, one element of said gear train being connected to an element of the differential mechanism in the housing 148.

The housing 148 is rigid with an axle housing 149, and a shaft (not shown) within said housing 148 is operatively connected to a drive wheel 150 and to an element of said differential mechanism. Also rigid with the housing 148 is a shaft housing 151 terminating at its end remote from the housing 148 in a part-spherical portion 152 provided with a spherical lug 153 received in a bracket 164 carried by a cross member 154 of the frame 140. Another tubular housing 155 encloses a shaft 156 and terminates, at its inner end, in a part-spherical portion 157 received within the portion 152 of the housing 151, and held therein by a collar 158. The shaft 156 is operatively connected, at its outer end, to a drive wheel 165.

A shaft 159 received within the housing 151 is connected at its one end to an element of the differential mechanism in the housing 148, and at its opposite end said shaft 159 is connected through a universal joint 160, disposed within the spherical joint between the housings 151 and 155, to the adjacent end of the shaft 156.

The tubular housing 149 is suitably secured to a spring 161, and the end of the housing 155 remote from the portion 157 is suitably secured to another spring 162.

When employing the Hotchkiss drive with a solid axle housing construction both the resilient members (springs), which are usually mounted within proximity of the driving wheels, take the torque reaction. As will be clear from Figs. 4, 8, and 9 the torque reaction in this invention is taken by one resilient member (spring), the one which is attached to the primary axle housing unit. This will result in a more flexible drive so desirable in passenger cars. For certain purposes, like heavy duty trucks, the spherical joint connecting the primary and secondary axle housings might be provided with a key (not shown) to transfer the torque to both springs.

The location and construction of the fulcrum joint connecting the inner end of the primary axle unit to the frame is of great importance. When the simple axle constructions of Figs. 1 to 7 are used, the fulcrum may be located in the horizontal plane of the axle, as shown. In such constructions, the driving wheels oscillate about a point or points in that plane and, since the road-engaging portions of the drive wheels are located at a point lower than the fulcrum, such oscillations will rather materially widen the vehicle tread when the vehicle springs are compressed, and narrow the tread when the frame rebounds. It will be noted, however, that, in all of the embodiments of my invention illustrated herein, the centers of oscillation of the two axle units are disposed substantially in a single horizontal plane, so that "scuffing" or tread widening is equalized between the two wheels.

Figures 10, 11, 12:
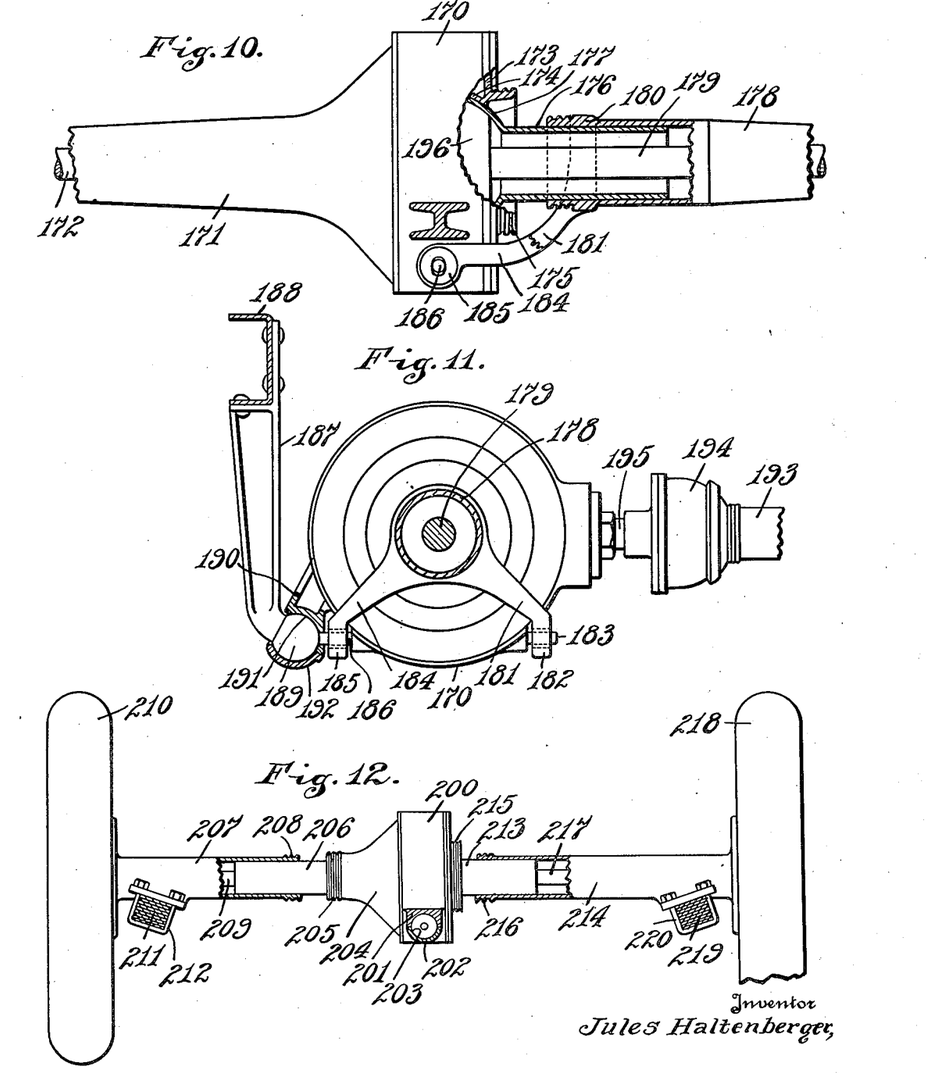
Fig. 10 is a fragmental elevation of a modified form of driving shaft and axle housing construction, parts being shown in section.
Fig. 11 is a view taken at right angles to the plane of Fig. 10.
Fig. 12 is a more or less diagrammatic view of a still further embodiment, parts being broken away for clarity of illustration.

It may be desirable to reduce this tread variation, and Figs. 10, 11, and 12 illustrate structures whereby such variation may be reduced. In each of these figures, the point at which the primary axle unit is fulcrumed to the frame is located at a point below the horizontal plane including the wheel driving shafts. The structure illustrated in Fig. 12 substantially eliminates all tread variations.

As has been stated, where swinging axle structures are used in conjunction with the Hotchkiss drive, the primary axle unit must be fulcrumed to the frame through a universal joint such as the spherical joints illustrated in Figs. 4 to 12 inclusive.

Referring, now, to Figs. 10 and 11, it will be seen that I have illustrated a differential housing 170 to one side of which is rigidly secured a tubular axle housing 171 enclosing a wheel driving shaft 172. The opposite side of the housing 170 is closed by a plate 173 having a part-spherical flange 174 projecting into the interior of the housing 170, and having a substantially cylindrical flange 175 projecting outwardly for a purpose later to be described.

A short tubular housing 176 is formed at its inner end with a part-spherical portion 177 co-operating with the flange 174, whereby said housing 176 is oscillably connected to the housing 170.

A longer tubular housing 178 is telescopically sleeved over the outer end of the housing 176. A wheel driving shaft 179 is received within the housings 176 and 178, and has its inner end operatively connected to an element of the differential mechanism enclosed within the housing 170 through a universal joint indicated diagrammatically at 196, such joint being of such construction as to permit axial reciprocation of the shaft 179 with respect to said differential mechanism.

The housing 178 terminates at its inner end in a collar 180 which may be integral with said housing or which may be rigidly secured thereto in any desired manner. An arm 181 rigidly secured to said collar 180 projects therefrom and terminates in a hub 182 having a vertically elongated aperture receiving a pin 183 projecting from the housing 170, so that said arm is pivotally secured to said housing 170. A second arm 184 likewise projects rigidly from said collar 180 and terminates in a hub 185 having a similar aperture receiving a pin 186 projecting from said housing 170 and aligned with said pin 183.

A bracket 187 depends from an element 188 of the vehicle frame and terminates in a ball 189 received in a spherical socket 191 formed by the cooperation of a bracket 190 secured to the housing 170 and a cap 192.

I have illustrated the usual propeller shaft 193 connected through a universal joint in the housing 194 with a shaft 195 mounted in the housing 170 and operatively connected to an element of the differential mechanism within said housing.

A flexible boot may have its one end connected to the flange 175 and its opposite end connected to the collar 180.

Since the socket 191 receiving the ball 189 is located at a point materially below the horizontal plane including the driving shafts, it will be obvious that the road-engaging portions of the driving wheels are more nearly positioned in the horizontal plane of the fulcrum point than is the case in the structures illustrated in Figs. 4 to 9 inclusive. Consequently, the degree of lateral movement of the wheel carried by the housing 171 as said housing is oscillated, is materially less than is the case where structures such as those of Figs. 4 to 9 inclusive are used. The telescopic association of the housings 176 and 178, together with the arrangement of the arms 181 and 184, likewise permits the road-engaging portion of the wheel carried by the housing 178 to move in an arc having its center disposed in the axis of oscillation of the housings 170 and 171, whereby the lateral movement of said portion of said wheel is similarly reduced.

The construction of Figs. 10 and 11 further provides for transmission of driving torque and brake reaction through the housings 171 and 178 to their associated springs; and this construction also provides control of the relation of the wheels carried on the housings 171 and 178. That is, said wheels may be controllably held normally in parallelism or in any desired "toeing in" relation by the arms 181 and 184.

In Fig. 12 is illustrated still another embodiment designed to prevent tire wear resulting from movement of the wheels inwardly and outwardly with respect to the frame. The differential housing 200 carries a bracket 201 with which cooperates a cap 202 to provide a spherical socket 203 adapted to receive a ball on the end of a bracket similar to the bracket 187, whereby the housing 200 is oscillably mounted on the frame.

A tubular housing 204 is rigidly secured to one side of the differential housing 200, said housing terminating in a reduced extension 206 with which is telescopically associated the inner end of a tubular housing 207. Said housing 204 is provided with a portion 205 upon which may be mounted one end of a flexible boot, the other end of which may be secured to the portion 208 of the housing 207. A wheel driving shaft 209 is received within said housings 206 and 207, said shaft being operatively associated at its one end with a driving wheel 210 carried by the housing 207, and being telescopically associated at its opposite end with an element of the differential mechanism within the housing 200.

The usual vehicle spring 211 is secured to the housing 207 by a plurality of spring clips 212, attention being called to the fact that the plane of flexure of the spring 211 is inclined upwardly and inwardly.

To the opposite side of the differential housing 200 is oscillably secured, in any desired manner, a tubular housing 213 with which is telescopically associated a tubular housing 214. A flexible boot may have its one end secured to a flange 215 carried by the housing 200, and may have its other end secured to a portion 216 at the inner end of the housing 214.

A wheel driving shaft 217 is received within the housings 213 and 214. At its outer end said shaft 217 is operatively associated with a driving wheel 218 carried by the housing 214; and at its inner end said shaft is operatively associated, through a universal joint permitting axial movement of the shaft 217, with an element of the differential mechanism within the housing 200.

A vehicle spring 219 of usual construction is secured to the outer end of the housing 214 by a plurality of spring clips 220, it being noted that the plane of flexure of the spring 219 is inclined upwardly and inwardly.

Obviously, since the road-engaging portions of the wheels 210 and 218 lie below the axes of oscillation of the housings 206 and 207 on the one side and the housings 213 and 214 on the other side, movement of either wheel upwardly toward the vehicle frame will have a tendency to force the road-engaging portion of the wheel to move outwardly with respect to the frame. Such upward movement of the wheel, however, flexes the spring 211 or 219; and, since the planes of flexure of those springs are inclined upwardly and inwardly, flexure of the spring will tend to move the wheel inwardly with respect to the frame. The particular angle of inclination of the planes of flexure of the springs 211 and 219 may be so designed that movement of either wheel upwardly or downwardly with respect to the frame will result, because of the telescopic arrangement of the axle housings, in substantially vertical movement of the road-contacting portion of the wheel.

I claim as my invention:

1. In an automotive vehicle, a frame, a wheel-supporting unit fulcrumed adjacent its inner end directly on said frame, and a second wheel-supporting unit fulcrumed adjacent its inner end solely on said first-mentioned unit, the fulcrums for both of said wheel-supporting units being located substantially in a single horizontal plane.

2. In an automotive vehicle, a frame, a wheel-supporting unit, means connecting said unit, adjacent the inner end thereof, to said frame, and permitting limited universal movement of said unit with respect to said frame, a second wheel-supporting unit, and a joint connecting said units and permitting limited universal movement of said units with respect to each other.

3. In an automotive vehicle, a frame, a wheel-supporting unit fulcrumed adjacent its inner end directly on said frame, resilient means connected to said unit adjacent the outer end thereof and connecting the same to said frame, a second wheel-supporting unit fulcrumed adjacent its inner end solely on said first-mentioned unit, the fulcrum point for said second unit being located substantially in the horizontal plane containing the fulcrum point for said first-mentioned unit, and resilient means connected to said second unit adjacent the outer end thereof and connecting the same to said frame.

4. In an automotive vehicle, a frame, a wheel-supporting unit fulcrumed adjacent its inner end and below its center line on said frame, and an extensible wheel-supporting unit, means connecting the adjacent ends of said wheel-supporting units and permitting limited relative universal movement of said units.

5. In an automotive vehicle, a frame, a wheel-supporting unit fulcrumed adjacent its inner end on said frame, an extensible wheel-supporting unit, means connecting the adjacent ends of said wheel-supporting units and permitting limited relative universal movement of said units, and means engaging both of said units and operable to compensate for variations in the spacing between the road-engaging portions of the wheels carried by said units resulting from oscillation of one of said units, by varying the length of said extensible unit.

6. In an automotive vehicle, a frame, a wheel-supporting unit, means connecting below its center line the inner end of said unit to said frame, said connecting means being constructed to permit oscillation of said unit with respect to said frame, an extensible wheel-supporting unit fulcrumed at its inner end on the inner end of said first-mentioned unit, and an arm having its one end pivoted on said first-named unit, the pivot point of said arm being located in the axis of oscillation of said first-mentioned unit, and having its opposite end operatively connected to said extensible unit to effect extension and contraction thereof.

7. In an automotive vehicle, a frame, a wheel-supporting unit, means connecting the inner end of said unit to said frame, said connecting means being constructed to permit oscillation of said unit with respect to said frame, an element oscillably connected to the inner end of said unit, a second wheel-supporting unit telescopically related to said element, and an arm rigid with said second-named unit and pivoted to said first-named unit in the axis of oscillation of said first-named unit.

8. In an automotive vehicle, a frame, a wheel-supporting unit, means connecting the inner end of said unit to said frame, said connecting means being constructed to permit oscillation of said unit with respect to said frame, an element oscillably connected to the inner end of said unit outside the axis of oscillation of said unit, a second wheel-supporting unit telescopically related to said element, and an arm rigid with said second-named unit and pivoted to said first-named unit in the axis of oscillation of said first-named unit.

9. In an automotive vehicle, a frame, a pair of springs mounted on said frame, the planes of flexure of said springs being inclined upwardly and inwardly, an extensible wheel-supporting unit having its one end fulcrumed on said frame and having its opposite end secured to one of said springs, and a second extensible wheel-supporting unit having its one end fulcrumed on said first unit and having its opposite end secured to the other of said springs.

10. In an automotive vehicle, a frame, a pair of springs mounted on said frame, the planes of flexure of said springs converging upwardly, an extensible wheel-supporting unit comprising an element fulcrumed on said frame and a second element telescopically related to said first element and secured to one of said springs, and a second extensible wheel-supporting unit comprising an element fulcrumed on said first element of said first unit and another element telescopically associated with said last-named element and secured to the other of said springs.

11. In an automotive vehicle, a frame, a propeller shaft, a differential mechanism including a housing, means at the center line of the housing securing said housing to said frame, means operatively connecting said shaft to drive an element of said mechanism, a pair of axles connected, respectively, to separate elements of said differential mechanism, one of said axles being rigidly connected to its differential element, and a universal joint interposed between the other of said axles and its differential element.

12. In an automotive vehicle, a frame, a propeller shaft, a differential mechanism including a housing, means engaging said housing at a point at least as low as the horizontal center line of said housing and securing said housing directly to said frame, means operatively connecting said shaft to drive an element of said mechanism, a pair of drive wheels, spring means connecting said drive wheels to said frame, and means connecting said drive wheels, respectively, to separate elements of said differential mechanism, one only of said wheels being connected to its differential element for oscillatory movement with respect thereto.

13. The combination with a differential mechanism, of a housing therefor, a tubular housing rigidly secured to said differential housing and projecting laterally therefrom, a shaft enclosed in said tubular housing and connected to an element of said differential mechanism, a second tubular housing flexibly associated with said differential housing and projecting laterally therefrom, a shaft enclosed in said second tubular housing, a universal joint connecting said last-mentioned shaft with another element of said differential mechanism, and means carried by said differential housing and lying substantially in the horizontal plane including the center of said universal joint, for fulcruming said housing on a vehicle.

14. The combination with a vehicle frame, of a differential housing, means connecting said housing to said frame, said means including an articulated joint between said housing and frame, differential mechanism within said housing, a tubular housing rigidly associated with said differential housing and projecting laterally therefrom, a second tubular housing associated with said differential housing through an articulated joint and projecting laterally therefrom, and independent shafts mounted in said respective tubular housings and connected to separate elements of said differential mechanism, one of said shafts being so connected through a universal joint, and said first-mentioned joint being positioned at a level at least as low as that occupied by the adjacent ends of said shafts.

15. In an automotive vehicle, a frame, a propeller shaft, differential mechanism including a housing, means connecting said housing to said frame, a tubular housing enclosing said propeller shaft and rigidly connected to said differential housing, means operatively connecting said propeller shaft to an element of said differential mechanism, a second tubular housing rigidly connected to said differential housing and extending substantially perpendicular to said shaft housing, a wheel driving shaft in said second tubular housing and operatively connected to an element of said differential mechanism, a radius rod rigidly connecting said shaft housing and said last-mentioned housing at points remote from said differential housing, a third tubular housing flexibly connected to said differential housing in substantial alignment with said second tubular housing, a wheel driving shaft in said third tubular housing and connected, through a universal joint, with an element of said differential mechanism, a radius rod connecting said third tubular housing and said shaft housing at points remote from said differential housing, and a hinged joint in said last-mentioned radius rod between the elements connected thereby.

16. In an automotive vehicle, a frame, a prime mover mounted on said frame and having a main shaft, said shaft extending transversely of said frame, a pair of tubular housings connected, at their adjacent ends, by a flexible joint, means movably connecting one element of said joint to said frame, independent spring means connecting the separated ends of said tubular housings to said frame, a pair of shafts mounted within said tubular housings, a universal joint connecting adjacent ends of said shafts, and articulated means connecting said prime mover shaft to drive said pair of shafts.

17. An attachment for substitution in an automotive vehicle, comprising an axle housing, a hinge element carried at the inner end of said housing, a shaft received in said housing, an element of a universal joint carried at the inner end of said shaft, a cooperating joint element adapted to be connected to an element of the differential mechanism of a vehicle, and means adapted to be secured to the differential housing of such vehicle and formed with a hinge portion cooperable with said hinge element for oscillably securing said axle housing to said differential housing.

18. In an automotive vehicle, a frame, a prime mover mounted on said frame and having a main shaft, said shaft extending transversely of said frame, a pair of tubular housings connected, at their adjacent ends, by a flexible joint, means movably connecting one element of said joint to said frame, a pair of shafts mounted within said tubular housings, a universal joint connecting adjacent ends of said shafts, and articulated means connecting said prime mover shaft to drive said pair of shafts.

19. In an automotive vehicle, a frame, a prime mover mounted on said frame and having a main shaft, said shaft extending transversely of said frame, a pair of tubular housings connected, at their adjacent ends, by a flexible joint, means movably connecting one element of said joint to said frame, a differential housing rigid with one of said tubular housings, differential mechanism therein, a pair of shafts in said one tubular housing connected, at their adjacent ends, to separate elements of said differential mechanism, a shaft in the other of said tubular housings, a universal joint connecting an end of said last-mentioned shaft with the adjacent end of one of said pair of shafts, a propeller shaft, and means, including two universal joints, operatively connecting said propeller shaft with said prime mover main shaft and with an element of said differential mechanism.

20. In an automotive vehicle, a frame, a prime mover mounted on said frame and having a main shaft, said shaft extending transversely of said frame, a pair of tubular housings connected, at their adjacent ends, by a flexible joint, means movably connecting one element of said joint to said frame, a differential housing rigid with one of said tubular housings, differential mechanism therein, a pair of shafts in said one tubular housing connected, at their adjacent ends, to separate elements of said differential mechanism, a shaft in the other of said tubular housings, a universal joint connecting an end of said last-mentioned shaft with the adjacent end of one of said pair of shafts, a propeller shaft, and articulated means operatively connecting said prime mover main shaft with an element of said differential mechanism.

21. In an automotive vehicle, a frame, a prime mover mounted on said frame and having a main shaft, said shaft extending transversely of said frame, a pair of tubular housings extending transversely of said frame and connected, at their adjacent ends, by a flexible joint means movably connecting one element of said joint to said frame, independent spring means connecting the separated ends of said tubular housings to said frame, a differential housing rigid with one of said tubular housings, differential mechanism therein, a pair of shafts in said one tubular housing connected, at their adjacent ends, to separate elements of said differential mechanism, a drive wheel carried at the opposite end of one of said shafts, a shaft in the other of said tubular housings, a universal joint connecting an end of said last-mentioned shaft with the adjacent end of the other of said pair of shafts, a drive wheel carried at the free end of said last-mentioned shaft, a propeller shaft extending transversely of said frame, and means, including two universal joints, operatively connecting said propeller shaft with said prime mover main shaft and with an element of said differential mechanism.

22. An attachment for substitution in an automotive vehicle, comprising an axle housing, a part-spherical element carried at the inner end of said housing, an axle received in said housing, an element of a universal joint carried at the inner end of said axle, a cooperating joint element adapted to be connected to an element of the differential mechanism of a vehicle, and means adapted to be secured to the differential housing of such vehicle and formed with a part-spherical portion cooperable with said part-spherical element for oscillably securing said axle housing to said differential housing.

23. An attachment for substitution in an automotive vehicle comprising an axle housing, a part-spherical element carried at the inner end of said housing, an axle received in said housing, an element of a universal joint carried at the inner end of said axle, a cooperating joint element adapted to be connected to an element of the differential mechanism of a vehicle, means adapted to be secured to the differential housing of such vehicle and formed with a part-spherical portion cooperable with said part-spherical element for oscillably securing said axle housing to said differential housing, and means for oscillably securing said differential housing to the vehicle frame.

24. Mechanism constructed in accordance with claim 2, including driving wheels carried by said units, driving shafts associated with said units and operatively connected to said wheels and to each other, and means for driving said shafts.

25. Mechanism constructed in accordance with claim 4, including driving wheels carried by said units, driving shafts associated with said units and operatively connected to said wheels and to each other, and means for driving said shafts.

26. Mechanism constructed in accordance with claim 5, including driving wheels carried by said units, driving shafts associated with said units and operatively connected to said wheels and to each other, and means for driving said shafts.

27. Mechanism constructed in accordance with claim 6, including driving wheels carried by said units, driving shafts associated with said units and operatively connected to said wheels and to each other, and means for driving said shafts.

28. Mechanism constructed in accordance with claim 7, including driving wheels carried by said units, driving shafts associated with said units and operatively connected to said wheels and to each other, and means for driving said shafts.

29. Mechanism constructed in accordance with claim 8, including driving wheels carried by said units, driving shafts associated with said units and operatively connected to said wheels and to each other, and means for driving said shafts.

30. Mechanism responding to claim 2, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and connected, through a universal joint, with another element of said differential mechanism.

31. Mechanism responding to claim 4, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and connected, through a universal joint, with another element of said differential mechanism.

32. Mechanism responding to claim 5, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and connected, through a universal joint, with another element of said differential mechanism.

33. Mechanism responding to claim 6, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and connected, through a universal joint, with another element of said differential mechanism.

34. Mechanism responding to claim 7, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and connected, through a universal joint, with another element of said differential mechanism.

35. Mechanism responding to claim 8, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and connected, through a universal joint, with another element of said differential mechanism.

36. Mechanism responding to claim 9, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and connected, through a universal joint, with another element of said differential mechanism.

37. Mechanism responding to claim 10, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and connected, through a universal joint, with another element of said differential mechanism.

38. Mechanism responding to claim 1, in which the first wheel-supporting unit includes a power shaft and power transfer gearing, a shaft in said first unit operatively connected to the wheel carried by said unit and to an element of said gearing, a shaft in said second unit operatively connected to the wheel carried by said second unit and connected, through a universal joint, with another element of said gearing, and resilient means connecting the outer end of the first wheel-supporting unit to the frame, whereby the torque reaction of said power shaft is taken by said resilient means.

39. Mechanism responding to claim 2, in which the first wheel-supporting unit includes a power shaft and power transfer gearing, a shaft in said first unit operatively connected to the wheel carried by said unit and to an element of said gearing, a shaft in said second unit operatively connected to the wheel carried by said second unit and connected, through a universal joint, with another element of said gearing, and resilient means connecting the outer end of the first wheel-supporting unit to the frame, whereby the torque reaction of said power shaft is taken by said resilient means.

40. Mechanism responding to claim 3, in which the first wheel-supporting unit includes a power shaft and power transfer gearing, a shaft in said first unit operatively connected to the wheel carried by said unit and to an element of said gearing, a shaft in said second unit operatively connected to the wheel carried by said second unit and connected, through a universal joint, with another element of said gearing, and resilient means connecting the outer end of the first wheel-supporting unit to the frame, whereby the torque reaction of said power shaft is taken by said resilient means.

41. Mechanism responding to claim 4, in which the first wheel-supporting unit includes a power shaft and power transfer gearing, a shaft in said first unit operatively connected to the wheel carried by said unit and to an element of said gearing, a shaft in said second unit operatively connected to the wheel carried by said second unit and connected, through a universal joint, with another element of said gearing, and resilient means connecting the outer end of the first wheel-supporting unit to the frame, whereby the torque reaction of said power shaft is taken by said resilient means.

42. Mechanism responding to claim 5, in which the first wheel-supporting unit includes a power shaft and power transfer gearing, a shaft in said first unit operatively connected to the wheel carried by said unit and to an element of said gearing, a shaft in said second unit operatively connected to the wheel carried by said second unit and connected, through a universal joint, with another element of said gearing, and resilient means connecting the outer end of the first wheel-supporting unit to the frame, whereby the torque reaction of said power shaft is taken by said resilient means.

43. Mechanism responding to claim 6, in which the first wheel-supporting unit includes a power shaft and power transfer gearing, a shaft in said first unit operatively connected to the wheel carried by said unit and to an element of said gearing, a shaft in said second unit operatively connected to the wheel carried by said second unit and connected, through a universal joint, with another element of said gearing, and resilient means connecting the outer end of the first wheel-supporting unit to the frame, whereby the torque reaction of said power shaft is taken by said resilient means.

44. Mechanism responding to claim 7, in which the first wheel-supporting unit includes a power shaft and power transfer gearing, a shaft in said first unit operatively connected to the wheel carried by said unit and to an element of said gearing, a shaft in said second unit operatively connected to the wheel carried by said second unit and connected, through a universal joint, with another element of said gearing, and resilient means connecting the outer end of the first wheel-supporting unit to the frame, whereby the torque reaction of said power shaft is taken by said resilient means.

45. Mechanism responding to claim 8, in which the first wheel-supporting unit includes a power shaft and power transfer gearing, a shaft in said first unit operatively connected to the wheel carried by said unit and to an element of said gearing, a shaft in said second unit operatively connected to the wheel carried by said second unit and connected, through a universal joint, with another element of said gearing, and resilient means connecting the outer end of the first wheel-supporting unit to the frame, whereby the torque reaction of said power shaft is taken by said resilient means.

46. Mechanism responding to claim 9, in which the first wheel-supporting unit includes a power shaft and power transfer gearing, a shaft in said first unit operatively connected to the wheel carried by said unit and to an element of said gearing, a shaft in said second unit operatively connected to the wheel carried by said second unit and connected, through a universal joint, with another element of said gearing, and resilient means connecting the outer end of the first wheel-supporting unit to the frame, whereby the torque reaction of said power shaft is taken by said resilient means.

47. Mechanism responding to claim 10, in which the first wheel-supporting unit includes a power shaft and power transfer gearing, a shaft in said first unit operatively connected to the wheel carried by said unit and to an element of said gearing, a shaft in said second unit operatively connected to the wheel carried by said second unit and connected, through a universal joint, with another element of said gearing, and resilient means connecting the outer end of the first wheel-supporting unit to the frame, whereby the torque reaction of said power shaft is taken by said resilient means.

48. Mechanism responding to claim 1, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and telescopically associated, through a universal joint, with another element of said differential mechanism.

49. Mechanism responding to claim 2, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and telescopically associated, through a universal joint, with another element of said differential mechanism.

50. Mechanism responding to claim 3, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and telescopically associated, through a universal joint, with another element of said differential mechanism.

51. Mechanism responding to claim 4, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and telescopically associated, through a universal joint, with another element of said differential mechanism.

52. Mechanism responding to claim 5, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and telescopically associated, through a universal joint, with another element of said differential mechanism.

53. Mechanism responding to claim 6, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and telescopically associated, through a universal joint, with another element of said differential mechanism.

54. Mechanism responding to claim 7, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and telescopically associated, through a universal joint, with another element of said differential mechanism.

55. Mechanism responding to claim 8, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and telescopically associated, through a universal joint, with another element of said differential mechanism.

56. Mechanism responding to claim 9, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and telescopically associated, through a universal joint, with another element of said differential mechanism.

57. Mechanism responding to claim 10, in which the first wheel-supporting unit includes a differential housing directly fulcrumed to said frame and enclosing differential mechanism, a shaft in said first unit operatively connected to the wheel carried by said unit and to an element of said differential mechanism, and a shaft in said second unit operatively connected to the wheel carried by said second unit, and telescopically associated, through a universal joint, with another element of said differential mechanism.

58. In an automotive vehicle, a frame, a propeller shaft, differential mechanism including a housing, means on said frame providing a fixed fulcrum for said housing, means rigidly associated with said housing and directly swivelled on said fulcrum means, a tubular housing enclosing said propeller shaft and rigidly connected to said differential housing, means operatively connecting said propeller shaft to an element of said differential mechanism, a second tubular housing rigidly connected to said differential housing and extending substantially perpendicular to said shaft housing, a wheel driving shaft in said second tubular housing and operatively connected to an element of said differential mechanism, a third tubular housing flexibly connected to said differential housing in substantial alignment with said second tubular housing, and a wheel driving shaft in said third tubular housing and connected, through a universal joint, with an element of said differential mechanism.

59. In an automotive vehicle, a frame, a wheel-supporting unit, means connecting said unit, adjacent the inner end thereof, to said frame, and permitting limited universal movement of said unit with respect to said frame, a second wheel-supporting unit, and a joint connecting the adjacent ends of said units and permitting limited relative angular movement of said units.

60. In an automotive vehicle, a frame, differential mechanism mounted on said frame, a driving-wheel-supporting unit hinged on said frame adjacent its inner end and below the horizontal plane passing through the center of said differential mechanism, and a second driving-wheel-supporting unit fulcrumed at a point adjacent its inner end and substantially in the horizontal plane including the hinge point of said first-named unit, and driving means associating both of said units with said differential mechanism, said means including a universal joint.

61. In an automotive vehicle, differential mechanism, a wheel-driving shaft operatively associated with one element of said mechanism, a wheel-driving shaft operatively associated with another element of said mechanism, and a single constant-angular-velocity universal joint interposed between said shafts.

62. In an automotive vehicle having a body, an element substantially stationary with respect to said body, differential mechanism mounted on said element, a driving-wheel-supporting unit hinged on said element adjacent its inner end and below the horizontal plane passing through the center of said differential mechanism, and a second driving-wheel-supporting unit fulcrumed at a point adjacent its inner end and substantially in the horizontal plane including the hinge point of said first-named unit, and driving means associating both of said units with said differential mechanism, said means including a universal joint.

JULES HALTENBERGER.